United States Patent [19]
Hutton

[11] Patent Number: 5,440,479
[45] Date of Patent: Aug. 8, 1995

[54] APPARATUS AND METHOD FOR PURCHASING FLORAL ARRANGEMENTS

[76] Inventor: Glenn W. Hutton, 9725 Hammocks Blvd., No. 206, Miami, Fla. 33196

[21] Appl. No.: 216,170

[22] Filed: Mar. 22, 1994

[51] Int. Cl.⁶ .............................................. G06F 17/60
[52] U.S. Cl. .................................................... 364/401
[58] Field of Search ............... 364/401, 403, 404, 408, 364/405, 464.01, 468

[56] References Cited
U.S. PATENT DOCUMENTS

| | | |
|---|---|---|
| 4,026,642 | 5/1977 | Tanaka et al. . |
| 4,490,810 | 12/1984 | Hon .................... 364/410 |
| 4,528,643 | 7/1985 | Freeny, Jr. . |
| 4,593,376 | 6/1986 | Volk . |
| 4,677,565 | 6/1987 | Ogaki et al. . |
| 4,703,465 | 10/1987 | Parker . |
| 4,734,858 | 3/1988 | Schlafly ................ 364/408 |
| 4,775,935 | 10/1988 | Yourick . |
| 4,787,050 | 11/1988 | Suzuki . |
| 4,797,818 | 1/1989 | Cotter ................... 364/401 |
| 4,803,348 | 2/1989 | Lohrey et al. ............ 235/381 |
| 4,817,043 | 3/1989 | Brown . |
| 4,873,643 | 10/1989 | Powell et al. . |
| 4,905,094 | 2/1990 | Pocock et al. . |
| 4,949,257 | 8/1990 | Orbach . |
| 4,970,655 | 11/1990 | Winn et al. . |
| 4,974,170 | 11/1990 | Bouve et al. . |
| 4,982,346 | 1/1991 | Girouard et al. ............ 364/401 |
| 4,992,940 | 2/1991 | Dworkin .................. 364/401 |
| 5,014,212 | 5/1991 | Smith . |
| 5,036,472 | 7/1991 | Buckley et al. . |
| 5,038,293 | 8/1991 | Goodman . |
| 5,056,029 | 10/1991 | Cannon . |
| 5,109,482 | 4/1992 | Bohrman . |
| 5,117,354 | 5/1992 | Long et al. ............ 364/401 |
| 5,235,509 | 8/1993 | Mueller et al. . |
| 5,289,371 | 2/1994 | Abel et al. ............ 364/401 |

*Primary Examiner*—Donald E. McElheny, Jr.
*Attorney, Agent, or Firm*—Dilworth & Barrese

[57] ABSTRACT

The present invention relates to a floral kiosk system which interacts with a floral ordering network and which allows users to either select a particular floral arrangement or create a floral arrangement from an assortment of flowers, flower configurations and flower holders. Once the purchase order is completed the system of the present invention interacts with a floral network to complete the transaction.

15 Claims, 8 Drawing Sheets

APPARATUS AND METHOD FOR PURCHASING FLORAL ARRANGEMENTS

BACKGROUND OF THE INVENTION

1. Field of the Invention

The present invention relates to a floral point-of-purchase apparatus and a method associated with the apparatus for purchasing floral arrangements from florists at locations remote to florists. More particularly, the present invention relates to floral kiosk system which interacts with a floral ordering network and which allows the customer to select a particular floral arrangement, arrange for delivery of the arrangement to the desired location and to pay for the arrangement at locations remote to a florist.

2. Description of the Related Art

Purchasing floral arrangements is currently limited to either traveling to a florist and personally ordering a particular arrangement of flowers, or calling a florist and ordering a generalized category of floral arrangement. Another way to purchase floral arrangements is to place a telephone call to an existing network, such as the well known FTD ® network, and order a generalized category of arrangement.

The present invention relates to an apparatus and method for purchasing floral arrangements directly by a consumer, and which permits customers to visualize, select and purchase predetermined floral arrangements from locations remote to florists. Further, the present invention provides a floral purchasing apparatus which allows customers to create and purchase personalized floral arrangements.

SUMMARY OF THE INVENTION

The present invention relates to an apparatus for purchasing floral arrangements from remote locations. The apparatus includes a user station having means for interfacing with a user, means for facilitating payment of the purchase and means for printing purchase data, database means positioned within the user station and having stored data representing predefined floral information, and processing means positioned within the user station and having stored programs and memory. The central processing means is associated to the interfacing means and is provided to transmit user data thereto and receive user data therefrom. The processing means is also connected to the payment means, to the printing means and to the database means so as to permit the user station to display floral arrangements, to receive payments and to provide a receipt of the transaction. Preferably, the interfacing means comprises a display having a touch sensitive screen and the payment means comprises a magnetic card reader. In addition, the apparatus of the present invention may further include means operatively connected to the central processing means for interfacing the user station with remote floral networks.

The predefined floral information stored within the database includes flower configurations within a flower holder in one embodiment, and assorted flowers, assorted flower configurations and assorted flower holders, wherein the user can select which flowers, flower configuration and holder to form the floral arrangement, in another embodiment.

In an alternative embodiment, the apparatus of the present invention includes data storage and retrieval means for storing predefined floral data and for retrieving at least a portion of the predefined floral data, display means for displaying the retrieved floral data, user interface means for permitting selection of the displayed floral data, processing means operatively connected to the data storage and retrieval means, the display means and the user interface means for coordinating the operation thereof, and means for interfacing the processing means to remote floral networks so as to facilitate transfer of the selected floral data to the remote network.

Additionally, the present invention provides a method for purchasing predefined floral arrangements from remote locations. The method includes the steps of storing a plurality of predefined floral arrangements in a database of a user station, selectively retrieving at least one of the predefined floral arrangements from the database and displaying the retrieved arrangements on display means which is integrally associated with the user station, selecting at least one of the displayed floral arrangements, and ordering the at least one selected floral arrangement from the user station using network interface means integrally associated therewith and connected to a remote floral network. In the preferred embodiment, the method also includes the step of paying for the ordered floral arrangement using payment accepting means integrally associated with the user station.

The present invention also provides a method for purchasing user created floral arrangements from remote locations. In this embodiment, the method includes storing predefined floral data in a database of a user station, the floral data including a plurality of flowers, a plurality of flower configurations and a plurality of flower holders, retrieving the floral data from the database and displaying the retrieved floral data on display means integrally associated with the user station. A customer then selects floral data displayed on the display means so that at least one of the plurality of flowers, at least one of the flower configurations and at least one of the flower holders are selected to create the floral arrangement. To complete the purchase, the created arrangement is ordered from the user station utilizing an integral network interface which is operatively connected to a remote floral network.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
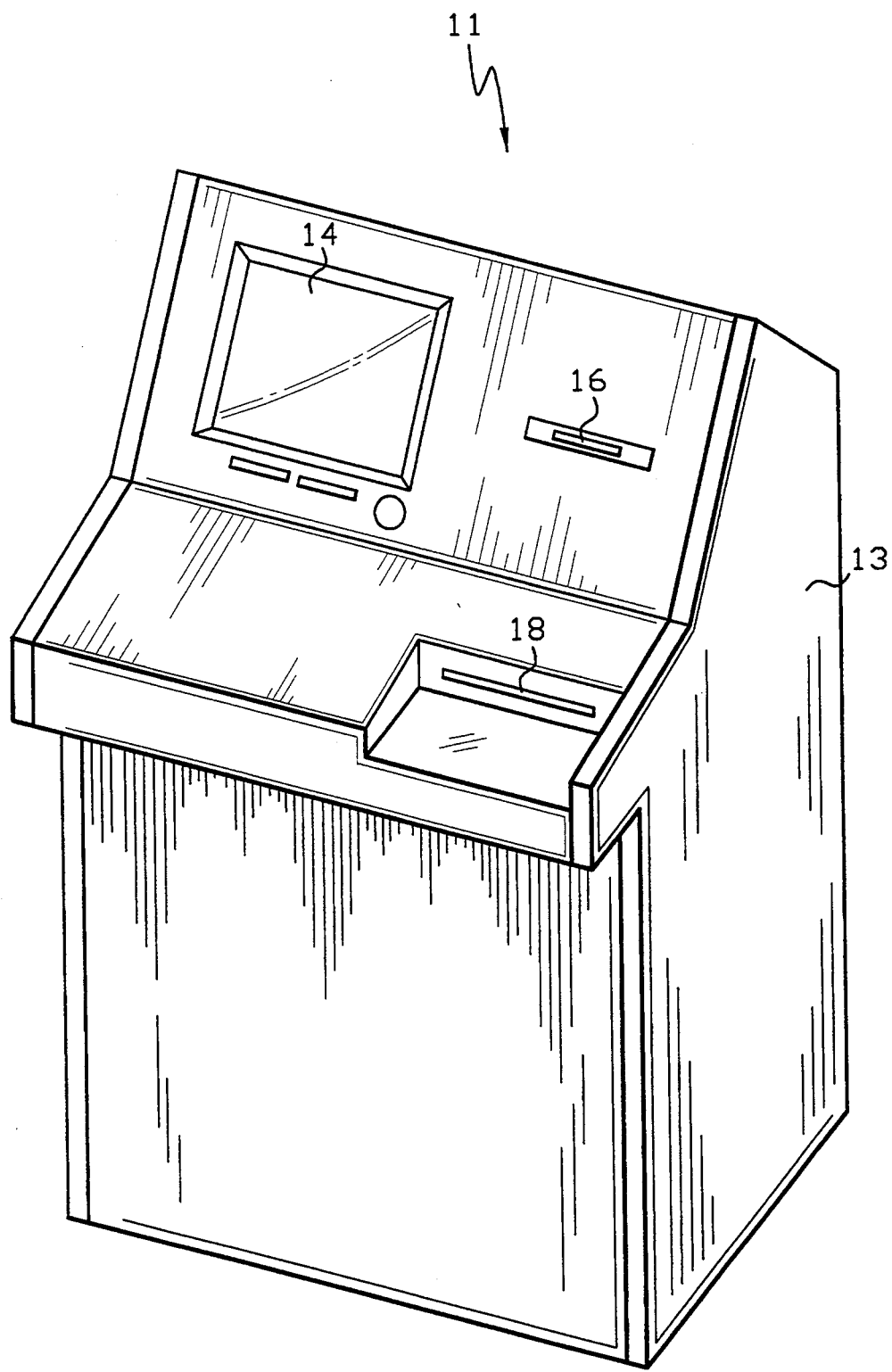
FIG. 1 is a perspective view of the point-of-purchase apparatus of the present invention.
Figure 2:
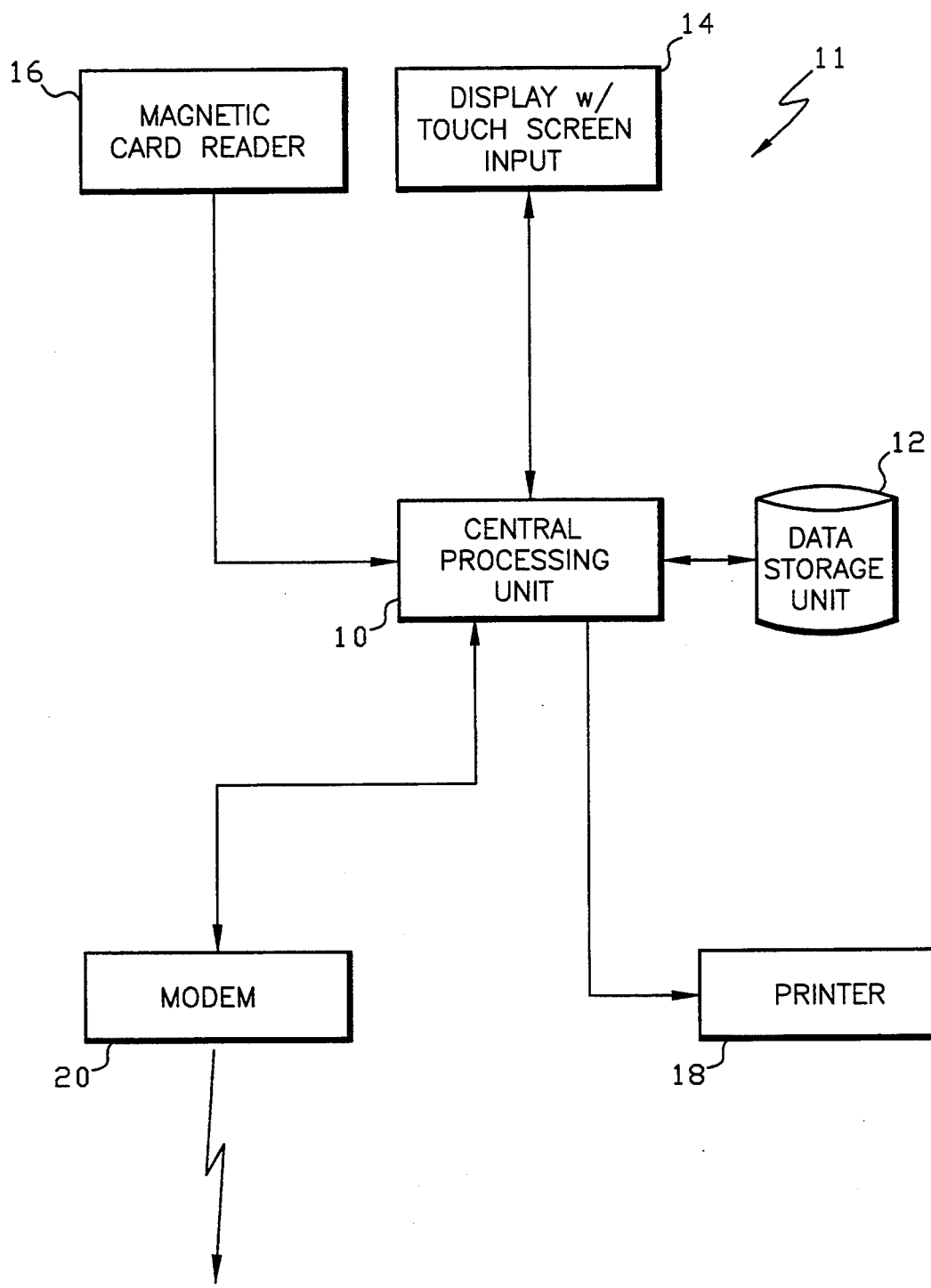
FIG. 2 is a block diagram of the components of the floral point-of-purchase apparatus of the present invention.
Figure 3:
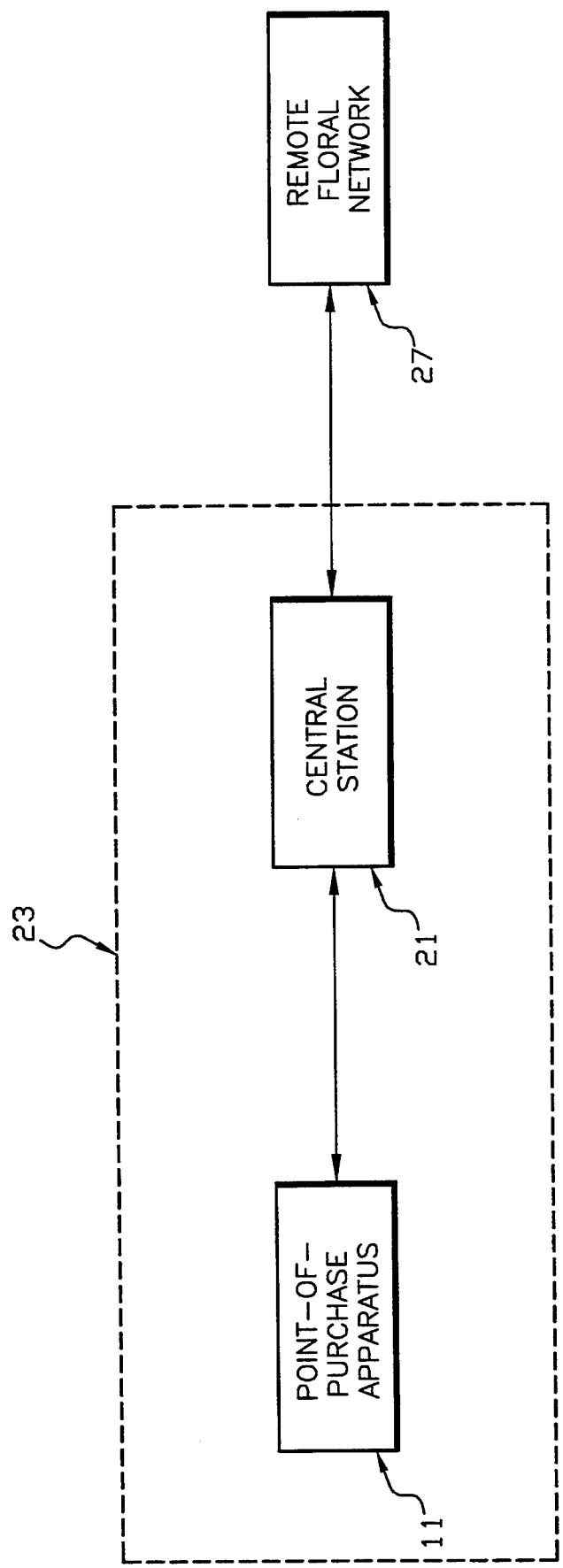
FIG. 3 is a block diagram of an exemplary floral point-of-purchase system which includes the point-of-purchase apparatus of the present invention.

Generally, as shown in FIGS. 1 and 2, the floral point-of-purchase apparatus 11 of the present invention includes central processing unit 10, data storage unit 12, graphic display 14 with touch screen input capabilities, magnetic card reader 16, printer 18 and modem 20 all of which are housed in a single enclosure. Preferably, the housing 13 is configured for placement in retail settings, such as malls, grocery stores and drug stores, or in other public environments.

In the preferred embodiment, central processing unit 10 includes a 32 bit microprocessor or microcontroller, such as the i486DX2166 manufactured by Intel, memory for storing system and application programs and input/output (I/O) support circuitry. Data storage unit 12 may include various types of memory devices, such as a CD ROM, fixed disks, floppy disks and like storage devices. Data storage unit 12 is provided to store the various types of predefined floral arrangements as well as the various elements, e.g., types of flowers, types of flower containers and types of configurations, utilized to create floral arrangements in a database.

The display 14 is provided with a touch sensitive screen template and provides a graphic image of the various floral arrangements. The touch sensitive screen permits customer interaction with the system of the present invention to facilitate selection of predefined floral arrangements or to facilitate the creation of personalized floral arrangements. A suitable display with touch sensitive screen template is the Clear TEK 1000, manufactured by MICROTOUCH.

Continuing to refer to FIG. 1, magnetic card reader 16 is connected to the central processing unit 10 and is provided to facilitate payment of the floral arrangement using preferably, a credit card or a debit card. However, known devices which accept cash payments are also contemplated.

In FIG. 1, printer 18 is connected to central processing unit 10 and is provided to print out a receipt of the transaction when payment is completed. Printer 18 may also be utilized to print out the results of internal diagnostics performed by central processing unit 10. In addition, modem 20 is utilized to transmit the information relating to the particular floral arrangement selected and the information relating to the sender and recipient of the arrangement to a floral network (or to a central station) which receives orders and subsequently arranges for a florist associated with the network and nearest the recipient to make the arrangement and distribute it to the recipient. One example of such a suitable floral network is the well known FTD ® network. In instances where a central station 21 is utilized to form the point-of-purchase system 23, the information transmitted by modem 20 is received by a computer in the central station 21 and stored in memory. Thereafter, either an operator contacts a florist nearest the recipient or the FTD ® network 27 to arrange for the purchase of the floral arrangement. Alternatively, the computer in the central station may directly contact the FTD ® network via a modem and provide the necessary information to complete the order.

Figure 4:
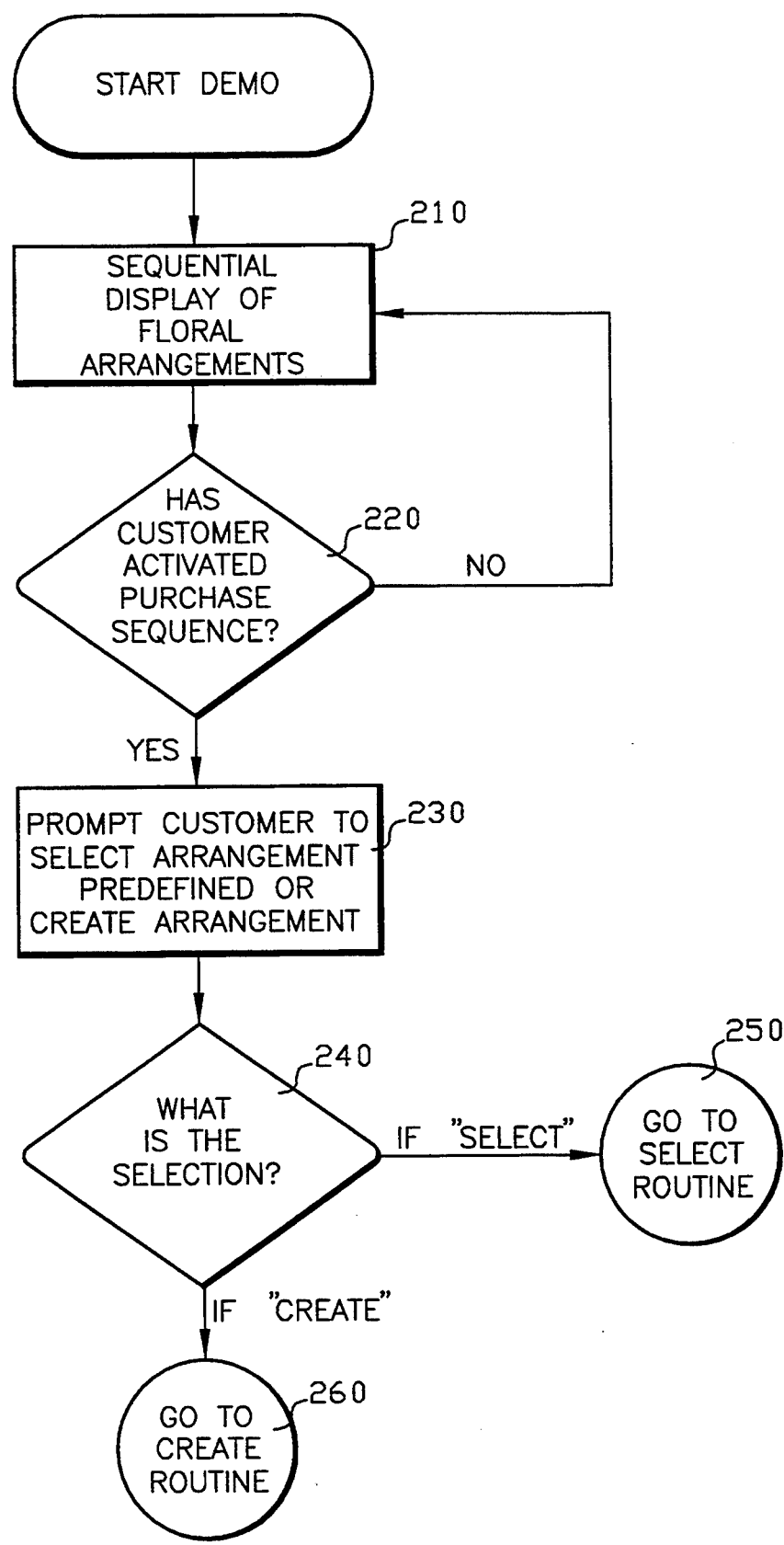
FIG. 4 is a flow-chart diagram for an exemplary demonstration routine for the central processing unit of the present invention.

The operation of the apparatus of the present invention will be described with reference to FIG. 4. The apparatus is initially placed into a demonstration routine and waits for a customer to activate a purchase sequence. The demonstration routine sequentially displays the various floral arrangements stored in the database of data storage unit 12 (steps 210, 220). Typically, the purchase sequence is activated by pressing a start button on the touch sensitive display. Once the purchase sequence is activated, the customer is prompted to choose between purchasing a selected predefined floral arrangement and purchasing a personalized floral arrangement which is created by the customer (step 230). If the predefined arrangement is selected the SELECT routine is executed (steps 240 and 250). If the create an arrangement is selected the CREATE routine is executed (steps 240 and 260).

Figure 5:
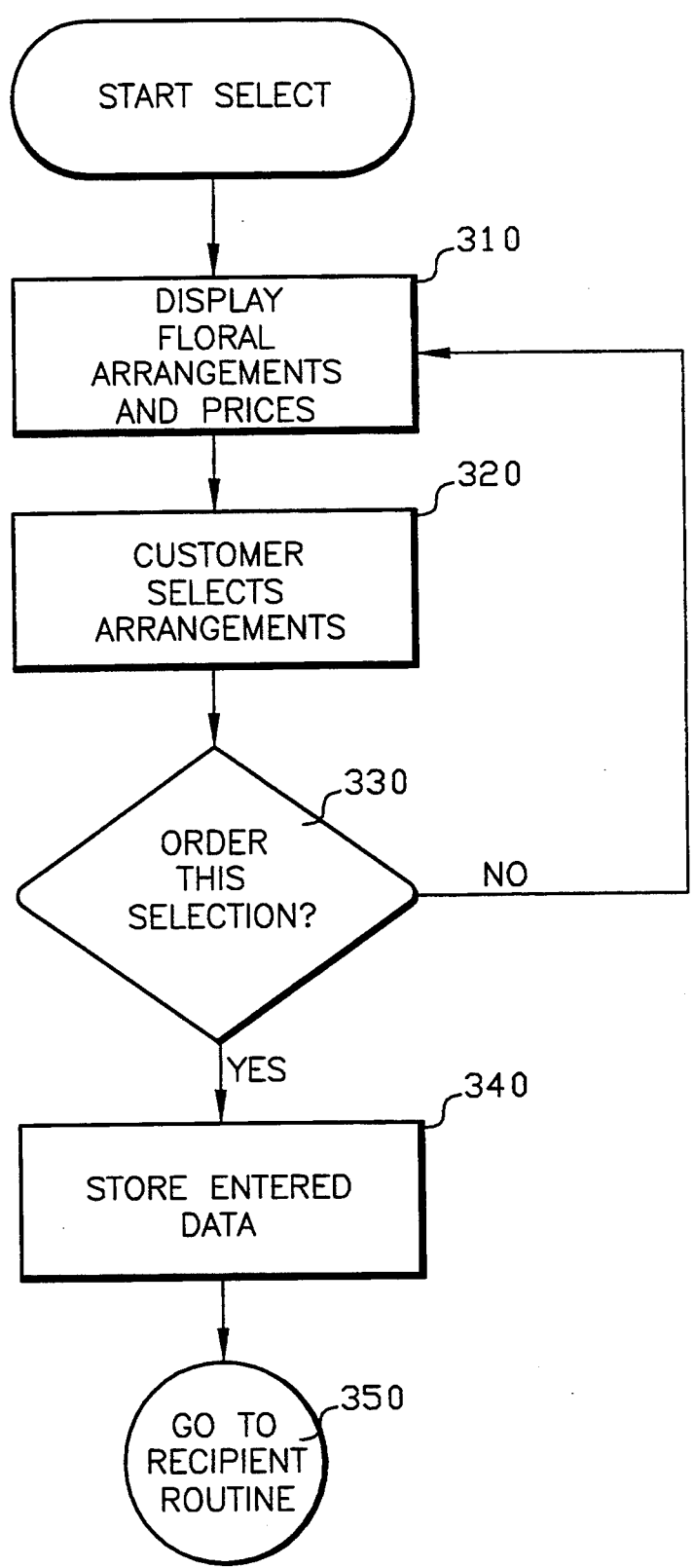
FIG. 5 is a flow-chart diagram for an exemplary customer selection routine which permits a customer to order a predefined floral arrangement.

Referring to FIG. 5, an exemplary program SELECT routine in accordance with the present invention is shown. In the exemplary SELECT routine, central processing unit 10 initially retrieves from the data storage unit 12, either individually or in multiples, predefined floral arrangements and displays them on display 14 (step 310). The customer is then prompted to select the desired floral arrangement and is queried if the selected arrangement is acceptable (steps 320 and 330). If the arrangement is unacceptable the predefined arrangements are again retrieved and displayed and the customer is again prompted to select the desired arrangement (steps 330 and 310). If the selected arrangement is acceptable, information associated with the selected arrangement is formatted for transmission to the network, e.g., in a standard serial format for binary transmission, and stored in data storage unit 12 (step 340). When the selection is completed the RECIPIENT routine is executed (step 350) to provide the necessary information with respect to the recipient of the floral arrangement, as will be described in more detail below.

Figure 6:
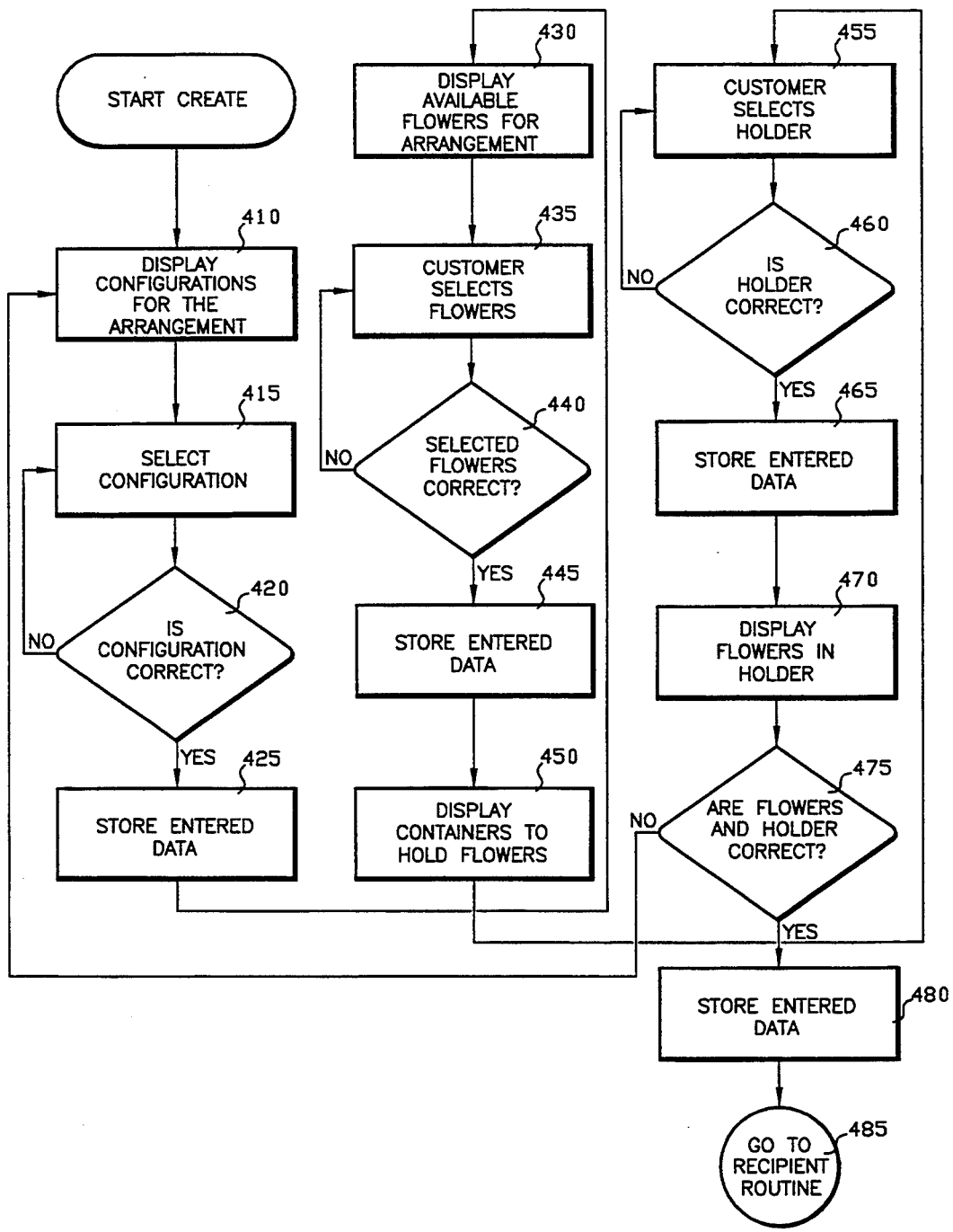
FIG. 6 is a flow-chart diagram for an exemplary customer create routine which permits a customer to select a particular floral arrangement and to select the types of flowers and the type of flower holders which may be included in a selected arrangement.

Referring now to FIG. 6, an exemplary CREATE routine in accordance with the present invention is illustrated. In the exemplary-CREATE routine, the central processing unit 10 initially retrieves from data storage unit 12, either individually or in multiples, predefined configurations in which selected flowers may be arranged and displays the configurations on display 14 (step 410). The predefined configurations for the flowers may include, for example, the location within a flower holder, e.g., a vase, for the flowers. The customer is then prompted to select the desired configuration and is queried as to whether the selected configuration is acceptable (steps 415 and 420). If the selection is unacceptable steps 415 and 420 are repeated until the desired configuration is correct. If the selection is acceptable, the configuration is stored in data storage unit 12 (step 425). Once the configuration of the flowers is selected, the central processing unit 10 retrieves from data storage unit 12 and displays on display 14, the various types of flowers and, if necessary the various types of fillers such as leatherleaf, which may be incorporated into the selected configuration (step 430). The customer selects each type of flower and filler, if any, desired and is queried as to whether the selected items are acceptable (steps 435 and 440). If the selected items are unacceptable steps 435 and 440 are repeated. If the items selected are acceptable, they are then stored in data storage unit 12 (step 445).

After the flowers and fillers are selected, the various flower holders or bases associated with the selected configuration are then retrieved and displayed by central processing unit 10 (steps 450). The customer is then prompted to select the desired holder for the flower arrangement and is queried as to whether the holder is acceptable (steps 455 and 460). If the selected holder is unacceptable, steps 455 and 460 are repeated. If the holder selected is acceptable, the selection is stored in data storage unit 12 (step 465). Once the types of flowers and fillers, the flower configuration and the type of flower holder are selected, central processing unit 10 combines these elements into the created flower arrangement and may store the arrangement in the data storage unit. In addition, central processing unit 10 may display the created arrangement on display 14 to allow the customer to visualize the newly created arrangement.

When the arrangement is finalized, the selected or created arrangement is then retrieved from data storage unit 12 and displayed on display 14 so the customer can visualize the final product (step 470). If the finalized floral arrangement is unacceptable the CREATE routine is repeated (step 475 and 410). If the finalized floral arrangement is acceptable, information associated with the created arrangement is formatted for transmission to the floral network or to the central station and stored in data storage unit 12 (step 480). Once the desired arrangement is completed the RECIPIENT program is executed (step 485) to provide the necessary information with respect to the recipient and sender of the floral arrangement.

Figure 7:
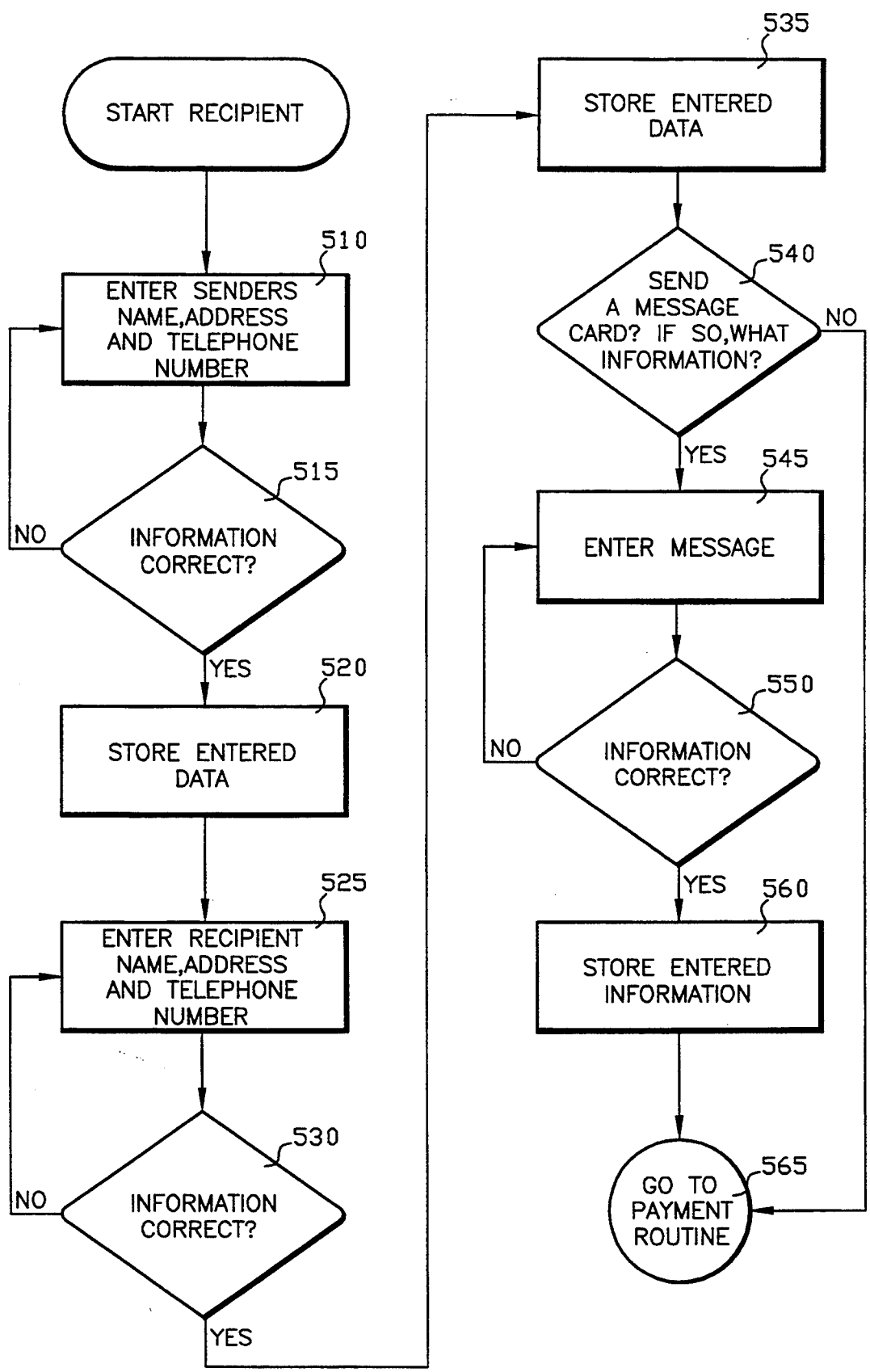
FIG. 7 is a flow-chart diagram for an exemplary recipient routine which identifies the sender and the recipient of the floral arrangement and an associated message for the recipient.

Referring to FIG. 7 an exemplary RECIPIENT program is illustrated. Initially, the customer is prompted to enter the name, address and telephone number of the sender (step 510). Once entered, the customer is then queried as to whether the sender information is correct (step 515). If the entered sender information is correct the data is stored in date storage unit 12 (step 520). If the entered sender information is incorrect the data is erased and the customer is again prompted to enter the sender's name, address and telephone number (steps 515 and 510). Once the sender's information is completed, the customer is prompted to enter the recipient's name, address and telephone number (step 525). After the recipient's information is entered, the customer is queried as to whether the data is correct. If the entered recipient information is correct, the information is stored in date storage unit 12 (step 535). If the entered information is incorrect, the information is erased and the customer is again prompted to enter the recipient's name, address and telephone number (steps 530 and 525).

After the sender's and recipient's information is finalized, the customer is queried as to whether or not the customer wants to send a message along with the floral arrangement (step 540). If a message not desired the PAYMENT program is then executed (steps 540 and 565). If a message is desired, the customer is prompted to enter the message using the touch sensitive screen of display 14 (step 545), and the customer is prompted as to whether the typed message is correct (step 550). If the entered information (message) is incorrect then steps 545 and 550 are repeated until the information is correct. If the information entered is acceptable the sender and recipient information as well as any associated message are stored in storage unit 12 (step 560) and the PAYMENT program is then executed (step 565).

Figure 8:
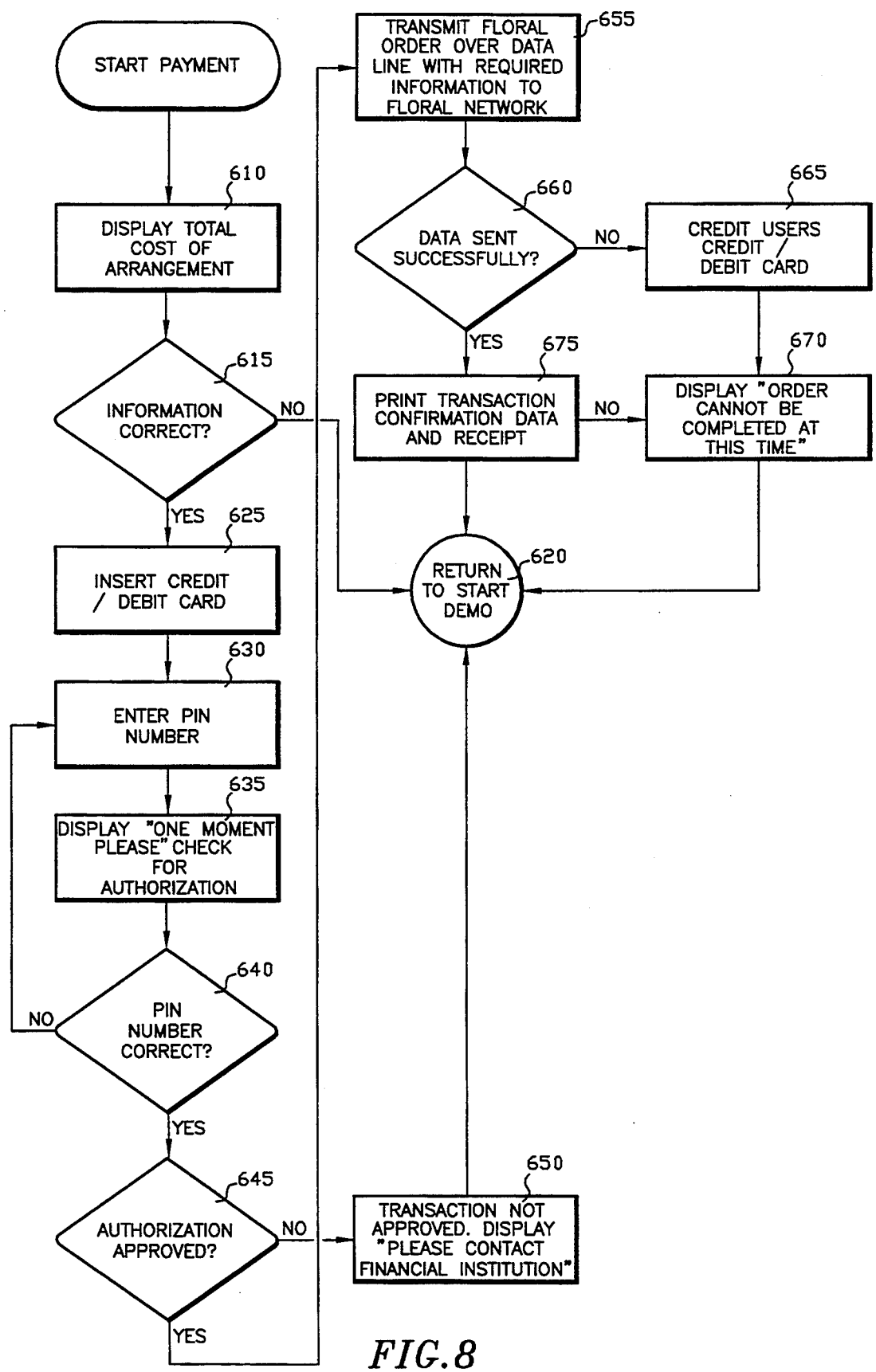
FIG. 8 is a flow-chart diagram for an exemplary payment routine for the central processing unit of the present invention.

Referring to FIG. 8 an exemplary PAYMENT program is illustrated. Initially the cost of the arrangement is calculated by central processing unit 10 and displayed on display 14 (step 610). The customer is prompted as to whether or not the cost information is correct and whether to complete the purchase (step 615). If the purchase is not to be completed, the DEMO program is executed (step 620). If the purchase is to be completed the customer is prompted to insert a credit or debit card into the magnetic card reader 16 (step 625). Alternatively, if a cash accepting device is installed with the system of the present invention, the customer would then be prompted to select a method of payment, e.g., cash or credit, and to insert either cash or a credit card depending upon the choice selected.

After the card is inserted, central processing unit 10 determines whether the card is valid. For example, the customer is prompted to insert a personal identification number (PIN), and central processing unit 10 then contacts, via modem 20, a financial authorization institution that the credit or debit card is valid (steps 630 and 635). If the is invalid steps 630 and 635 are repeated, typically, for a predetermined number of incorrect entries, e.g., three. If the PIN number is valid, central processing unit 10 determines if authorization for the transaction has been approved (steps 640 and 645). If authorization is not approved a transaction not approved message is displayed on display 14 and the DEMO program is executed (steps 650 and 620). If authorization is approved, the floral arrangement data is transmitted by central processing unit 10 via modem 20 to either the network or the central station (steps 645 and 655). The transmission is then verified to ensure that the data was successfully transmitted (step 660). If the data was not successfully transmitted the customer's credit or debit card is credited for the transaction (step 665) and an order cannot be completed message is displayed on display 14 (step 670). Thereafter, the DEMO program is executed (steps 670 and 620). If the data was successfully transmitted, the transaction confirmation data and receipt are printed by printer 18 and the system of the present invention then returns to the DEMO program for the next customer (steps 675 and 620).

It will be understood that various modifications can be made to the embodiments of the present invention herein disclosed without departing from the spirit and scope thereof. For example, various sizes of the housing are contemplated, as well as various types of components within the floral point-of-purchase system. Also, various modifications may be made in the configuration of the parts. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. Apparatus for purchasing floral arrangements, which comprises:
   a user station having user interface means for interfacing with a user, payment means for facilitating payment of the purchase and printing means for printing purchase data;
   database means positioned within said user station and having stored data representing floral information; and processing means associated within said user station and having stored programs and memory, said processing means being connected to:
a) said user interface means so as to permit a user to select the floral information and to configure the floral information to create a customized floral arrangement;
b) said payment means for receiving payment data therefrom;
c) said printing means for transmitting purchase data thereto; and
d) said database means for receiving the floral information therefrom.

2. The apparatus according to claim 1, wherein said user interface means comprises a display having a touch sensitive screen.

3. The apparatus according to claim 1, wherein said payment means comprises a magnetic card reader.

4. The apparatus according to claim 1, wherein said predefined floral information includes flower configurations within a flower holder.

5. The apparatus according to claim 1, wherein said predefined floral information includes assorted flowers, assorted flower configurations and assorted flower holders, wherein the user can select which flowers, flower configuration and holder to form the floral arrangement.

6. The apparatus according to claim 1 further comprising remote interface means operatively connected to said central processing means for interfacing said user station with remote floral networks.

7. Apparatus for purchasing floral arrangements, which comprises:
a portable housing;
data storage and retrieval means positioned within said portable housing for storing predefined floral data and for retrieving at least a portion of said predefined floral data;
display means connected to said portable housing for displaying said retrieved floral data;
user interface means connected to said portable housing for permitting selection of said displayed floral data;
processing means positioned within said portable housing and operatively connected to said data storage and retrieval means, said display means and said user interface means for coordinating the operation thereof; and
means operatively connected to said processing means for interfacing said processing means to remote floral networks so as to facilitate transfer of said selected floral data to the remote network.

8. The apparatus according to claim 7, further comprising means for accepting payment of said selected floral data.

9. The apparatus according to claim 7, wherein said predefined floral data includes flower configurations within a flower holder.

10. The apparatus according to claim 7, wherein said predefined floral data includes assorted flowers, assorted flower configurations and assorted flower holders, wherein the user can select which flowers, flower configuration and holder to form the floral arrangement.

11. A system for purchasing floral arrangements, which comprises:
data storage and retrieval means for storing predefined floral data and for retrieving at least a portion of said predefined floral data;
display means for displaying said retrieved floral data;
user interface means for permitting selection of said displayed floral data;
processing means operatively connected to said data storage and retrieval means, said display means and said user interface means for coordinating the operation thereof; and
means for interfacing said processing means to a central station so as to facilitate transfer of said selected floral data to remote floral networks;
said central station being configured to receive said selected floral data from said means for interfacing said processing means and to interface with remote floral networks so as to facilitate transfer of said selected floral data to the remote networks.

12. A method for purchasing predefined floral arrangements from remote locations, comprising:
storing a plurality of predefined floral arrangements in a database of a portable user station;
selectively retrieving at least one of said predefined floral arrangements from said database and displaying said retrieved arrangements on display means integrally associated with said portable user station;
selecting at least one of said displayed floral arrangements; and
ordering said at least one selected floral arrangement from said portable user station using network interface means integrally associated therewith and connected to a remote floral network.

13. The method according to claim 12, further comprising paying for said ordered floral arrangement using payment accepting means integrally associated with said user station.

14. A method for purchasing user created floral arrangements from remote locations, comprising:
storing predefined floral data in a database of a user station, said floral data including a plurality of individualized flowers, and a plurality of flower configurations;
retrieving said floral data from said database and displaying said retrieved floral data on display means integrally associated with said user station;
selecting floral data displayed on said display means such that at least one of said plurality of flowers, and at least one of said flower configurations are selected to create a customized floral arrangement; and
ordering said created floral arrangement from said user station using network interface means integrally associated therewith and connected to a remote floral network.

15. The method according to claim 14, further comprising paying for said ordered floral arrangement using payment accepting means integrally associated with said user station.

* * * * *